United States Patent [19]

Doshi

[11] Patent Number: 4,645,516

[45] Date of Patent: Feb. 24, 1987

[54] ENHANCED GAS SEPARATION PROCESS

[75] Inventor: Kishore J. Doshi, Mahopac, N.Y.

[73] Assignee: Union Carbide Corporation, Danbury, Conn.

[21] Appl. No.: 737,455

[22] Filed: May 24, 1985

[51] Int. Cl.$^4$ ............... B01D 53/22; B01D 53/04
[52] U.S. Cl. ................................. 55/16; 55/26; 55/62; 55/68; 55/70
[58] Field of Search ............ 55/16, 25, 26, 58, 62, 55/66, 68, 70, 73, 74, 75, 158, 387, 389

[56]  References Cited

U.S. PATENT DOCUMENTS

| | | | |
|---|---|---|---|
| 3,430,418 | 3/1969 | Wagner | 55/25 |
| 4,172,885 | 10/1979 | Perry | 423/359 |
| 4,180,552 | 12/1979 | Graham et al. | 55/16 X |
| 4,229,188 | 10/1980 | Intille | 55/16 |
| 4,238,204 | 12/1980 | Perry | 55/16 |
| 4,367,135 | 1/1983 | Posey, Jr. | 55/16 X |
| 4,398,926 | 8/1983 | Doshi | 55/16 |

FOREIGN PATENT DOCUMENTS 156414  9/1984  Japan .......................... 55/16

*Primary Examiner*—Robert Spitzer
*Attorney, Agent, or Firm*—Morris N. Reinisch

[57]  ABSTRACT

In the purification of gas streams by contact with a permeable membrane selective for the separation of desired components from impurities, harmful gas stream components are removed by means of a pressure swing adsorption system prior to passage of said gas streams to the permeable membrane. Where the harmful components nevertheless comprise valuable components of said gas streams, the purified portion of said gas stream, either the permeate or the non-permeate from said membrane, is used to supply purge gas to the pressure swing adsorption system for desorption and recovery of said harmful components together with said desired components purified upon contact with said membrane. Where said harmful components are not valuable components of said gas streams, the impurity portion of said gas stream, either permeate or non-permeate from said membrane, is used to supply purge gas to said pressure swing adsorption system for desorption and discard of said impurities and said harmful components from the gas purification operation.

19 Claims, No Drawings

ENHANCED GAS SEPARATION PROCESS

BACKGROUND OF THE INVENTION

1. Field of the Invention

The invention relates to the separation of desired components of a gas stream from impurities contained therein. More particularly, it relates to the enhancing of the recovery of high purity product in such gas separation operations.

2. Description of the Prior Art

Permeable membrane systems provide a commercially feasible means for separating and purifying a desired component or components from a feed gas mixture threreof with other less desired components or impurities. For such purposes, the feed gas mixture is passed to a gas permeable membrane capable of selectively permeating certain components of the mixture that are withdrawn from the discharge side of the membrane as a permeate gas at a reduced pressure. The non-permeate portion of the gas mixture is withdrawn from the feed side of the membrane essentially at the feed gas pressure. Typically, the component desired to be purified will be recovered as the permeate portion of the feed gas mixture, while the impurities associated therewith are withdrawn as the non-permeate portion of said feed gas mixture. In applications involving the purification of purge gases from the reaction loop of ammonia or methanol plants, such purge gases are commonly passed to a permeable membrane system at substantially the reaction pressure level. The components desired to be recovered, i.e., hydrogen and nitrogen in ammonia plants, and hydrogen and carbon dioxide in methanol plants, are recovered as permeate gas at a reduced pressure and, after recompression, are recycled to the ammonia or methanol loop for further production of the desired product. The purge gas from the reaction loop also typically contains ammonia or methanol together with various process impurities. Before such purge gas is brought into contact with the permeable membrane, such ammonia or methanol is desirably removed to the extent that such components might be harmful to the permeable membrane so as to affect its effectiveness over its intended operation life. For this purpose, a water wash or distillation process is typically employed, with said ammonia or methanol being removed in aqueous form.

The use of permeable separation membranes in the treatment of ammonia synthesis purge streams to recover hydrogen is taught by Gardner et al, in "Hollow Fiber Permeator for Separating Gases", Chemical Engineering Progress, October, 1977, pages 76 to 78. This approach was affirmed by Perry, U.S. Pat. No. 4,172,885, with reference to the known reaction of hydrogen and nitrogen at a superatmospheric pressure to produce ammonia. As stated therein, an ammonia-containing reaction effluent is withdrawn from the ammonia synthesis reaction zone. This reaction effluent, which contains substantial amounts of unreacted hydrogen and nitrogen, is recycled in a well-known ammonia synthesis loop to the ammonia synthesis reaction zone. Combined with this recycling reaction effluent in the ammonia synthesis loop is a synthesis feed gas stream of hydrogen, nitrogen and impurities such as methane and argon. In addition to the removal of product effluent from the reaction effluent in the ammonia synthesis loop, a purge stream is removed from the reaction effluent in an amount such as to maintain the proportion of impurities desirably low. In the process as described by Perry, the purge stream from the ammonia synthesis is chilled to condense and coalesce ammonia and is then scrubbed with water to provide a purge stream having less than about 0.5 volume % ammonia and water vapor therein. Alternatively, the ammonia content of the purge stream is reduced to less than 0.1 volume % by either chilling to coalesce ammonia, or adsorption or absorption of ammonia. The thus-treated purge stream, substantially at the synthesis reaction pressure level, is thereafter passed to the permeable membrane for permeation of hydrogen therethrough and reintroduction to the ammonia synthesis reaction zone.

It will be appreciated that ammonia removal pretreatment as indicated above necessarily results in the application of coalescers, scrubbers and the like, as well as the need for regenerating ammonia that is removed in the form of aqueous ammonia in order to avoid undue loss of product ammonia. While such an approach can be utilized in commercial operations, the development of improved techniques and systems would be desirable in the art. Thus, it is desirable that, in avoiding contact of the permeable membrane with feed gas components harmful thereto at particular concentrations, the pretreatment process be simplified and the need for employing water scrubbing and ammonia regeneration be avoided. At the same time, the enhanced recovery of the ammonia content of the purge gas is desirable so that the overall product recovery of the ammonia production operation can be enhanced. Those skilled in the art will appreciate that similar concerns and desires pertain to the field of methanol production. Similarly, a desire for such improvements exists with respect to other gas purification operations, not necessarily associated with a reaction synthesis loop, but wherein components of a feed stream harmful to a permeable membrane but otherwise valuable are desirably removed therefrom prior to contact with said membrane. In such operations, it is also generally desired to avoid the loss of such valuable components so that an enhanced recovery of desired, high purity product can be achieved.

It is an object of the invention, therefore, to provide an improved process for the separation of desirable components of a gas stream from impurities associated therewith.

It is another object of the invention to provide a process for the enhanced separation of impurities from a gas stream upon contact with a gas permeable membrane.

It is a further object of the invention to provide a process for facilitating the recovery of desirable components removed from a gas stream prior to the separation of impurities from said gas stream by contact with a gas permeable membrane.

With these and other objects in mind, the invention is hereinafer described in detail, the novel features thereof being particularly pointed out in the appended claims.

SUMMARY OF THE INVENTION

Components of a feed gas stream deemed harmful to a permeable separation membrane are removed therefrom prior to contact of said gas stream with the membrane. For this purpose, a pretreatment pressure swing adsorption system is employed. The purified gas stream from the membrane can be used as a purge gas for the pressure swing adsorption system to enhance recovery when said harmful components constitute valuable constituents of the feed gas stream. When said harmful components are not desired constituents of the feed gas stream, the waste stream from the membrane is similarly employed as a purge gas so as to facilitate the enhanced recovery of desired high purity product.

DETAILED DESCRIPTION OF THE INVENTION

The objects of the invention are accomplished by a novel combination of pressure swing adsorption (PSA) processing and permeable membrane separation operation. Such a combination, as described and claimed herein, serves to obviate the need to water scrub from a feed gas stream various components that may be harmful to the permeable membrane. Regeneration of the PSA system is facilitated in a manner enhancing the recovery of desired high purity product from the PSA-permeable membrane combination.

In the practice of the invention for the above-indicated, illustrative treatment of a purge gas from an ammonia synthesis loop, a PSA system is used to reduce the concentration of said ammonia in the purge gas prior to its contact with a permeable membrane. Thus, said ammonia is selectively adsorbed as a more readily adsorbable component of the purge gas, while unreacted hydrogen and nitrogen, together with impurities such as methane and argon, pass through the PSA system as a less readily adsorbable component thereof. Thus, ammonia is removed from the purge gas without the need for water scrubbing, and a treated gas stream in dry, ammonia-depleted form is passed from the PSA system to a separator zone containing a gas permeable membrane capable of selectively permeating the hydrogen and nitrogen components thereof. Methane and argon impurities are removed from the separator zone as non-permeable gas. While the ammonia removed in the pretreatment PSA system may be harmful to the particular permeable membrane being employed, it nevertheless comprises valuable product gas, the loss of which would adversely affect the high recovery desired from the overall ammonia production operations. The separation and desired recovery of ammonia from the synthesis loop purge gas by the prior art approaches are, however, necessarily costly and involve inconvenient processing operations. By contrast, the invention facilitates the recovery of such ammonia in a convenient manner conducive to the enhanced recovery of high purity ammonia product. Thus, the purified gas stream containing hydrogen and nitrogen removed from the separator zone as the permeate portion of the treated gas stream is recycled to the PSA system as a purge gas to facilitate desorption and recovery of the previously adsorbed ammonia from said system. The essentially dry purge gas effluent discharged from the PSA system, and containing hydrogen, nitrogen and said desorbed ammonia, is conveniently recycled to the ammonia loop as a purified gas stream substantially free of the impurities present in said ammonia synthesis loop purge gas, but substantially without undesired loss of ammonia product.

It will be appreciated that the process and system of the invention can be applied to a variety of other permeable membrane gas separation operations. For example, methanol production operations conventionally include the removal of purge gas from a methanol synthesis loop. This purge gas contains valuable methanol product gas desired to be recovered, but comprising a component deemed harmful to various typical permeable membrane materials. The purge gas is thus advantageously passed to a PSA system for the selective adsorption of said methanol prior to passing the resulting essentially dry, methanol-depleted, treated purge gas stream to said separator zone containing a gas permeable membrane capable of selectively separating the useful components from impurities present therein. In the methanol application, the desired product components, namely hydrogen and carbon dioxide, are selectively permeated through the membrane and recovered as the permeate portion of the treated gas stream. The impurities associated therewith, namely methane and nitrogen, are removed as the non-permeate portion of the treated gas stream. In the practice of the invention, said permeate portion is recycled to the PSA system, and an adsorbent bed thereof, as a purge gas to facilitate desorption and removal of methanol therefrom. The essentially dry purge gas effluent discharged from the PSA system thus contains hydrogen, carbon dioxide and said desorbed methanol, and is recycled to the methanol loop as a purified gas stream substantially free of the impurities present in said methanol synthesis loop purge gas, but substantially without undesired loss of methanol product. Another practical, illustrative embodiment of the invention resides in the treatment of a feed gas stream comprising natural gas to be separated from carbon dioxide, $H_2S$ and water, with said stream also containing various hydrocarbons that are both harmful to various permeable membrane materials and impurities with respect to a desired natural gas processing operation. Said harmful hydrocarbon impurities are selectively adsorbed in a pressure swing adsorption system, together with said $H_2S$ and water, prior to passage of the hydrocarbon, $H_2S$ and water-depleted natural gas stream to the separator zone containing said permeable membrane. The carbon dioxide gas is selectively permeated through said membrane, and the carbon dioxide containing permeate portion of the treated gas stream is recycled to the PSA system as a purge gas to desorb and remove the hydrocarbons and other adsorbed components constituting impurities with respect to the desired natural gas processing operation from the PSA system. In this instance, the purge gas effluent discharged from the PSA system is passed to waste or other use, while the non-permeate portion of the treated gas stream constituting a purified natural gas stream, is removed as product gas.

It will be appreciated that the invention enables a clean, dry feed gas stream to be passed to the permeable membrane, thereby enhancing membrane life and effectiveness, and the components of the initial feed stream deemed harmful to the membrane to be conveniently recovered in a high purity gas form rather than in the aqueous state. Thus, substantially less energy is required to achieve the desired separation and recovery of components as compared with water wash or distillation process. Furthermore, either the permeate or the non-permeate portion of the treated gas stream can be recycled to a reaction loop, or otherwise processed in particular applications, in advantageously water-free form.

The PSA system employed in the practice of the invention will contain one or more beds, with at least two adsorbent beds commonly being employed. It will be understood that the feed gas stream, such as the natural gas stream or the ammonia or methanol loop purge gases or the natural gas stream referred to above, is passed, on a cyclic basis, to each bed at the appropriate intervals in the processing sequence that includes (a)

adsorption at an upper adsorption pressure level, (b) cocurrent depressurization to an intermediate pressure level or levels, with release of void space gas from the product end of the bed, (c) countercurrent depressurization to a lower desorption pressure level, with release of gas from the feed end of the bed, (d) purge and (e) repressurization from said lower desorption pressure to said upper adsorption pressure. Those skilled in the art will appreciate that the PSA system will commonly contain at least three of four adsorbent beds, with systems containing up to ten or more beds being useful in particular applications depending on the production, purity and recovery requirements of a given application. Each bed of the system will generally comprise adsorbent particles known and commercially available in the art that are capable of selectively adsorbing the component(s) of the feed gas stream deemed harmful to the permeable membrane being employed. Each adsorbent bed will also be understood to include means for passing the feed gas to be treated to the feed end of the bed, and means for discharging the less readily adsorbed, treated gas stream from the discharge end thereof, and to be adapted for the carrying out of the processing steps indicated above on an appropriate cyclic basis.

In conventional pressure swing adsorption operations, the void space gas released from one bed is commonly passed, directly or indirectly, to another bed initially at a lower pressure for pressure equalizaton purposes. Additional void space gas can be released from the product end of the bed being cocurrently depressurized, with such void space gas being used to provide purge gas to another bed in the PSA system before such other bed is repressurized from its lower desorption pressure. In the practice of the invention, however, such use of cocurrent depressurization gas to desorb and recover components of the feed gas mixture harmful to the downstream permeable membrane, but constituting valuable product gas and/or a desirable reactant or reactants, would result in said components being recovered together with the impurities content of the cocurrent depressurization gas as well as with the useful components of the feed gas stream. Contrary to said conventional PSA practice, therefore, the treated gas stream removed from the PSA system is passed to the separation zone for the indicated separation of useful components of said gas stream from impurities associated therewith, with the purified gas stream withdrawn from the separator zone being recycled as purge gas to the adsorbent beds of the PSA system in place of cocurrent depressurization gas. Thus, impurities intended to be separated out of the feed gas stream by the PSA-membrane combination of the invention are not included in the purge gas for the PSA system. It will be appreciated that, in embodiments in which the harmful components removed from the feed gas stream do not constitute a desirable reactant or product gas, the practice of the invention enables such components to be desorbed from the adsorbent beds and removed from the PSA system without undesired loss of valuable product gas and/or desirable reactants. If, in such case, the void space gas released from one bed upon cocurrent depressurization were to be used as purge gas, as in conventional operations such as those described in the Wagner patent, U.S. Pat. No. 3,430,418, the desorption and removal of harmful components would be accompanied by the necessary loss of valuable reactants and/or product gas as well as by the discharge from the systems of undesired impurities. By recycling the gas stream containing a substantial amount of impurities from the separator zone to the PSA system as a purge gas to remove harmful, non-valuable components, prior to discharging said gas stream, i.e. either the permeate or more commonly non-permeate portion of the treated gas stream, the loss of useful reactants and/or product gas can be minimized. Thus, depending on the particulars of any given operation, means will be provided for recycling either the permeate portion or the non-permeate portion of the treated gas stream from the separator zone to the PSA system for use as purge gas therein. Conduit means are likewise provided to pass the purge gas effluent removed from the PSA system either to the applicable synthesis reaction zone or to waste or other purpose as the circumstances of a given application suggest.

It is within the scope of the invention to employ any suitable adsorbent in the adsorbent beds of the pretreatment PSA system. Thus, the adsorbent used will be such as to selectively adsorb the harmful components as a more readily adsorbable component of the feed gas mixture, while enabling the treated gas components to be separated in the separation zone to pass through the PSA system as a less readily adsorbable component of said feed gas mixture. A variety of adsorbent materials are well known in the art and suitable for use in the practice of the invention, depending upon the performance characteristics desired of adsorbent and the gas separation performance levels desired in any given application. Zeolitic molecular sieves, activated carbon, silica gel, activated alumina and the like are examples of suitable, commercially available adsorbents, with particular types of molecular sieve material being generally preferred for various pratical commercial applications of the invention.

The separator zone of the invention will contain a permeable membrane of any suitable form for the desired gas separation operations. Thus, the membrane may be employed in plate and frame form, or may comprise spiral wound film membranes, tubular membranes, hollow fiber membranes, or the like. The use of hollow fiber membranes is generally preferred due to the high surface area per unit of membrane that can be obtained thereby. It will be appreciated that, when membranes are used in tubular or hollow fiber form, a plurality of such membranes can conventionally be arranged in parallel bundle form. In such embodiments, the feed gas stream can be brought into contact with either the outer or shell side, or the inner or tube side of the membrane particles. It is commonly preferred to pass the feed gas stream to be treated to the shell side of the separation zone, as this arrangement generally results in a relatively lower pressure drop across the membrane than when the feed gas is passed to the tube side of the membrane. Those skilled in the art will appreciate that the flow of the feed gas and of the permeating gas within the separation zone can be either cocurrent or countercurrent. Using bundles of hollow fiber and tubular membranes, the passage of feed gas can be either radial or axial with respect to the direction in which the hollow fibers or tubular membranes are positioned within the separator zone.

It is within the scope of the invention to employ any suitable permeable membrane material capable of selectively separating the useful components of the treated gas stream passed from the PSA system by the permeable membrane-containing separator zone from the impurities contained therein. The invention may be practiced with either the useful components or the impurities being recovered as the permeate gas, and thus with either the permeate or the non-permeate portion of the treated gas stream being recycled to the PSA system as purge gas depending on the particular gas separation operation being carried out. In the ammonia and methanol loop purge gas applications referred to above, the permeate portion of the treated gas stream withdrawn from the separation zone is typically recycled to the PSA system as purge gas to facilitate desorption of the harmful but valuable components, i.e. ammonia and methanol in such applications, and removal thereof for recycle back to the ammonia and methanol synthesis loops in such respective production operations. In the natural gas treatment operation, the $CO_2$-containing non-permeate portion of the treated gas stream is reduced in pressure and recycled to the PSA system as purge gas to facilitate desorption of harmful, non-valuable impurities. Those skilled in the art will appreciate that the membrane materials that may be employed include metallic and inorganic membranes as well as various organic polymeric materials or such organic polymeric materials mixed with inorganic materials such as fillers reinforcements and the like. Organic polymers that may be considered for various practical commercial operations include such materials as polysulfones; polystyrenes; including such styrene-containing polymers as acrylonitrile-styrene copolymers, styrene-butadiene and styrene-vinylbenzyl halide copolymers; cellulosic polymers, such as cellulose acetate, cellulose acetate-butyrate, methyl or ehtyl cellulose; polyamides and polyimides; polycarbonates; polyurethanes, polyesters, including polyacrylates, polyethylene; polypropylene; polyvinyl pyridines, and the like. Such polymers may be either substituted or unsubstituted, with typical substituents of such substituted polymers including halogens, such as chlorine, fluorine and bromine; hydroxyl groups; lower alkyl groups; lower alkoxy groups; monocyclic aryl; lower acyl groups, etc.

As confirmed in the above indicated Perry patent, U.S. Pat. No. 4,172,885, the art generally desires to utilize a membrane material that is as thin as possible, while being sufficiently thick to assure that the membrane has sufficient strength to withstand the membrane separation conditions to which it is to be exposed. The use of a permeable membrane in conjunction with a coating material is also know, with such combinations enabling good selectivity of separation to be achieved together with high flux through the membrane. Typical coatings include substituted or unsubstituted polymers that are either solid or liquid under gas separation conditions. Examples of such coating materials include synthetic and natural rubbers, organic prepolymers, polyurethanes, polyamines and the like. It will be understood that such coatings may be polymerized either before or after the application thereof to the permeable membrane with which they are to be employed.

It will be appreciated that the components of the feed gas stream that are deemed harmful to the permeable membrane being employed need not necessarily be essentially completely removed in the pretreatment PSA system. Rather, the treated gas stream removed from the PSA system will comprise an esentially dry gas stream depleted of said harmful components such that the concentration of said harmful components in the treated gas stream is at a desired residual level such as to avoid undue damage to the permeable membrane being used upon contact of the treated gas stream therewith. Such residual level will, of course, vary depending upon the gas separation being made, the operating conditions employed, the particular PSA system employed, the composition and form of the permeable membrane, and the like. Those skilled in the art will appreciate that, as employed herein, the term "harmful" is used to denote (1) any effect adverse to the contemplated life of the membrane and its effectiveness over the couse of such membrane life and/or (2) any components that are undesirable or unacceptable in the membrane product gas.

As a typical example, the purge gas stream in the ammonia synthesis loop purge gas embodiment commonly contains on the order of about 0.5 to 5 vol.% ammonia. It is generally not economically feasible to employ the PSA-membrane combination of the invention with the residual ammonia level being in excess of about 0.5% after pretreatment in the PSA system. Practical commercial application can be made of the invention, in various embodiments thereof, with the PSA system being used to selectively adsorb ammonia such that the residual ammonia concentration of the ammonia-depleted, essentially dry treated gas stream is less than 0.5 volume %, as in the range of from about 0.1% to about 0.5 volume %. In other embodiments, it may be desirable to further reduce the ammonia level to less than 0.1 volume %, such as from about 10 to about 1,000 ppm. A similar flexibility will be understood to pertain to other gas separation operations carried out in accordance with the practice of the invention.

The operating conditions employed in the practice of the invention will be understood to depend upon the details of the particular gas separation operation and of the particular PSA system and permeable membrane unit employed. Referring to the ammonia synthesis loop purge gas application, it is known in the art that the ammonia synthesis reaction can be carried out over a relatively wide range of temperature and pressure conditions, with temperatures generally in the range of from about 150° C. up to about 600° C. The reaction effluent is used to heat the feed gas to the reactor by indirect heat exchange, as indicated above, so that the reaction effluent is typically at a temperature of less than 100° C. at the point where the purge gas stream is withdrawn from the loop. The ammonia synthesis pressure is generally in the range of from about 100 to about 200 atmospheres absolute, or more. The purge gas stream removed from the ammonia loop is generally passed to the PSA system at a pressure at least substantially in the range of said synthesis pressure, although higher or lower pressures can be employed depending upon the circumstances of a given application. This pressure thus constitutes the upper adsorption pressure of the PSA system. The treated gas stream removed from the PSA system, i.e. the less readily adsorbable component of the purge gas stream, will be at said upper adsorption pressure level. It is generally advantageous to pass the treated gas stream to the separator zone at as high a pressure as possible so as to avoid unnecessary recompression costs upon recycle of the purified gas stream from the separation zone to the ammonia loop. Thus, the treated gas stream is preferably passed to the separator zone at said upper adsorption pressure level, or essentially at said pressure level, although it will be understood that it is within the scope of the invention to pass the treated gas stream to the separator zone at any pressure level desired for a given application. The permeate portion of the treated gas stream will be understood to be obtained at a reduced pressure, with pressure drops of at least about 20 atmospheres and up to about 120 atmospheres, typically about 50-100 atmospheres, occurring across the permeable membrane. The non-permeable portion of the treated gas stream is passed from the separator zone at substantially the same pressure as that at which the treated feed gas is passed to the separator zone. In the ammonia purge gas application as discussed above, the permeate portion of the treated gas stream is recycled to the PSA system at a reduced pressure for use as purge gas to facilitate removal of the selectively adsorbed components from the adsorbent beds. Said reduced pressure comprises the lower desorption pressure level employed in the PSA processing cycle. In other applications, the non-permeate portion of the treated gas stream may be recycled to the PSA system at a reduced pressure corresponding to the lower desorption pressure of the PSA cycle, as in the natural gas treatment application referred to above. In a typical ammonia purge loop application, the purge gas is passed to a 3-bed PSA system containing a suitable adsorbent at an upper adsorption pressure of 130 atmospheres absolute, with the treated gas passing to a separator zone containing a suitable commercial membrane at essentially said upper adsorption pressure. The permeate gas, recovered at about 30 atmospheres and containing hydrogen and nitrogen free of undesired impurities, such as methane and argon, is recycled to the PSA system as a purge at said lower pressure, employed as the lower desorption pressure in the PSA processing cycle. Said purge gas facilitates desorption and recovery of ammonia selectively absorbed so that the treated gas stream is passed to the membrane-containing separator zone with a depleted ammonia concentration of about 0.1 volume % of said treated gas stream. The purge gas effluent removed from the PSA system is recycled to the ammonia synthesis compression train.

Those skilled in the art will appreciate that various changes and modifications can be made in the details of the process and system herein described without departing from the scope of the invention as set forth in the appended claims. If, for example, the permeate hydrogen containing gas stream is not available in sufficient quantity, the PSA bed regeneration step can be aided by the warming up of the permeate gas indirectly by means of steam or another heat containing source to facilitate desorption and removal of harmful components from the bed. Alternatively but less desirably, a portion of the non-permeate gas can be utilized for supplemental purge purposes after appropriate pressure reduction. As indicated above, the portion of the gas separated on the separation zone that is employed for purge purposes in the PSA system can be either the permeate or the non-permeate portion depending upon whether the selectively adsorbed component is to be removed or rejected. Thus, in a practical refinery application, adsorbed aromatics, $H_2S$ or $H_2O$ along with other hydrocarbons can be desirably rejected by the use of the undesired residue, or non-permeate, gas as the regenerating purge gas. In a toluene dealkylation application, adsorbed aromatics comprising useful components can be recovered and recycled to the main loop by utilizing the purified hydrogen stream recovered as the permeate portion as the regenerating purge gas.

The invention provides a highly advantageous and convenient means for achieving a product of desired specification in membrane gas separation processes in which the gas stream to be separated contains a component or components deemed harmful to the life and performance capabilities of the membrane. The pretreatment PSA system as employed in the practice of the invention provides desirable processing flexibility depending upon the circumstances of a given gas separation operation. The PSA-membrane combination, as employed in the practice of the invention, provides a significant advance in the gas separation art as applied to natural gas treatment, ammonia or methanol synthesis loop purge gas purification and other desirable industrial applications.

I claim:

1. In the process for the production of a desired product wherein a feed gas stream is treated to reduce its concentration of a component(s) harmful to a permeable membrane prior to said feed gas stream being contacted with said permeable membrane for the separation of components useful in said production of said desired product from undesired impurities present therewith, the improvement comprising:
(a) passing said feed gas stream at an upper adsorption pressure to the feed end of an adsorbent bed in a pressure swing adsorption system capable of selectively adsorbing said harmful component(s) present therein, with unadsorbed useful components of said feed gas stream being withdrawn from the product end of the bed at said upper pressure level as a treated gas stream depleted of said harmful component(s);
(b) passing said treated gas stream essentially at said upper adsorption pressure to a separator zone containing a gas permeable membrane capable of selectively separating said useful components from said undesired impurities present therewith to provide non-permeate and permeate portions, the concentration of said harmful component(s) in said treated gas stream being at a desired residual level;
(c) separately withdrawing the non-permeate and the permeate portions of the treated gas stream from the separator zone, one such portion comprising a purified gas containing said useful components of the feed gas stream, the other such portion containing a substantial amount of the impurities content of said treated gas stream passed to the separator zone;
(d) passing said purified gas withdrawn from the separator zone for use in the production of said desired product, said purified gas, or a portion thereof, being first recycled to an adsorbent bed in said pressure swing adsorption system at a pressure lower than said upper adsorption pressure as a purge gas to remove said harmful components(s) from the bed where said harmful component(s) comprises product gas and/or a desirable reactant(s) in the production of desired product;
(e) discharging said gas stream containing a substantial amount of impurities to waste or other use, with said gas stream being recycled to an adsorbent bed in said pressure swing adsorption system at a pressure lower than said upper adsorption pressure as a purge gas to remove said harmful component(s) from the bed where said harmful component(s) does not comprise a desirable reactant(s) in the production of desired product, whereby undesired contact of the permeable membrane with harmful components of said feed gas stream is avoided.

2. The process of claim 1 in which said purified gas stream comprises the permeate portion of the treated gas stream withdrawn from the separator zone.

3. The process of claim 2 in which said permeate portion of the treated gas stream is recycled to said pressure swing adsorption system at reduced pressure as a purge gas to remove therefrom harmful component(s) comprising product gas and/or reactant(s) in the production of desired product gas.

4. The process of claim 3 in whih said non-permeate portion of the treated gas stream is discharged to waste or other use.

5. The process of claim 4 in which said feed gas stream comprises an ammonia loop purge gas removed from an ammonia synthesis loop, said ammonia loop purge gas being passed to said pressure swing adsorption system for the selective adsorption of ammonia therefrom, said ammonia being harmful to the permeable membrane but comprising valuable product gas.

6. The process of claim 5 in which said treated gas stream in ammonia depleted form is passed to said gas permeable membrane capable of selectively permeating the hydrogen and nitrogen components thereof at reduced pressure, with methane and argon impurities comprising non-permeate components thereof.

7. The process of claim 6 in which said purified gas stream comprising essentially dry purge gas effluent discharged from the pressure swing adsorption system and containing hydrogen, nitrogen and desorbed ammonia is recycled to said ammonia loop.

8. The process of claim 7 in which said treated gas stream passed to the separator zone has an ammonia concentration of less than 0.5 volume %.

9. The process of claim 8 in which said ammonia concentration is from about 0.1% to about 0.5 volume %.

10. The process of claim 8 in which said ammonia concentration is less than 0.1 volume %.

11. The process of claim 10 in which said ammonia concentration is from about 10 to about 1,000 ppm.

12. The process of claim 8 in which said purge gas effluent is recycled to the ammonia synthesis feed gas being passed to the ammonia loop.

13. The process of claim 8 in which said purge gas effluent is recycled directly to said ammonia synthesis loop.

14. The process of claim 13 in which said ammonia concentration is from about 0.1 to about 0.5 volume %.

15. The process of claim 13 in which said ammonia concentration is less than about 0.1 volume %.

16. The process of claim 1 in which said feed gas stream comprises a methanol synthesis loop purge gas removed from a methanol loop, said methanol loop purge gas being passed to said pressure swing adsorption system for the selective adsorption of methanol therefrom, said methanol being harmful to the permeable membrane.

17. The process of claim 2 in which said feed gas stream comprises a natural gas stream contaning $H_2S$ and water as well as hydrocarbons that are harmful to the permeable membrane and impurities with respect to a desired natural gas processing operation, said harmful impurities being selectively adsorbed in the pressure swing adsorption system.

18. The process of claim 17 in which said non-permeate portion of the treated gas stream is recycled to said pressure swing adsorption system at reduced pressure as a purge gas to remove therefrom said components harmful to the permeable membrane and impurities with respect to the desired processing operation, the purge gas effluent discharged from the pressure swing adsorption system and containing said components being discharged to waste or other use.

19. The process of claim 1 and including heating the purge gas prior to its recycle to an adsorbent bed to facilitate desorption and removal of harmful components from the bed.

* * * * *